United States Patent
Adams et al.

[15] 3,653,177
[45] Apr. 4, 1972

[54] RETARDER MECHANISM

[72] Inventors: Richard C. Adams, West Barrington; John A. Merian, Barrington; John McGlashan, Pawtucket, all of R.I.

[73] Assignee: G. T. Schjeldahl, Northfield, Minn.

[22] Filed: Mar. 2, 1970

[21] Appl. No.: 15,660

[52] U.S. Cl. ............................................. 53/182, 53/184
[51] Int. Cl. .................... B65b 9/06, B65b 9/12, B65b 51/30
[58] Field of Search ...................... 53/28, 180, 182, 198, 229

[56] References Cited

UNITED STATES PATENTS 3,429,100   2/1969   Zelnick et al. ........................... 53/182

FOREIGN PATENTS OR APPLICATIONS 1,906,575   9/1969   Germany ................................ 53/182

Primary Examiner—Theron E. Condon
Assistant Examiner—Neil Abrams
Attorney—Orrin M. Haugen

[57] ABSTRACT

Apparatus for wrapping articles with shrinkable film and comprising, in combination, an endless article conveyor means having an article receiving end and an article delivery end, the conveyor means comprising a plurality of parallelly disposed belts having gaps formed between adjacent belts and being adapted to run continuously. Means are provided for sequentially delivering articles to be wrapped in a first predetermined spaced relationship onto the article receiving end of the conveyor, and means provided adjacent the receiving end for applying a wrap of film about the articles being wrapped and for enclosing the articles within a tubular container or enclosure with an axis parallel to the direction of motion of the conveyor. A transverse welding and severing bar is provided for severing the film between adjacent spaced wrapped articles, and for forming a transverse welded closure about the articles, and in order to reduce the tension on the film between adjacent articles, means are provided to stop or retard the motion of each article as its trailing edge passes beyond the zone of the welding bar, this motion interrupting or retarding mechanism effectively reducing the tension in the wrapping film which would otherwise be established between the successive articles as the welding bar moves downwardly into contact with the film surfaces being sealed.

7 Claims, 9 Drawing Figures

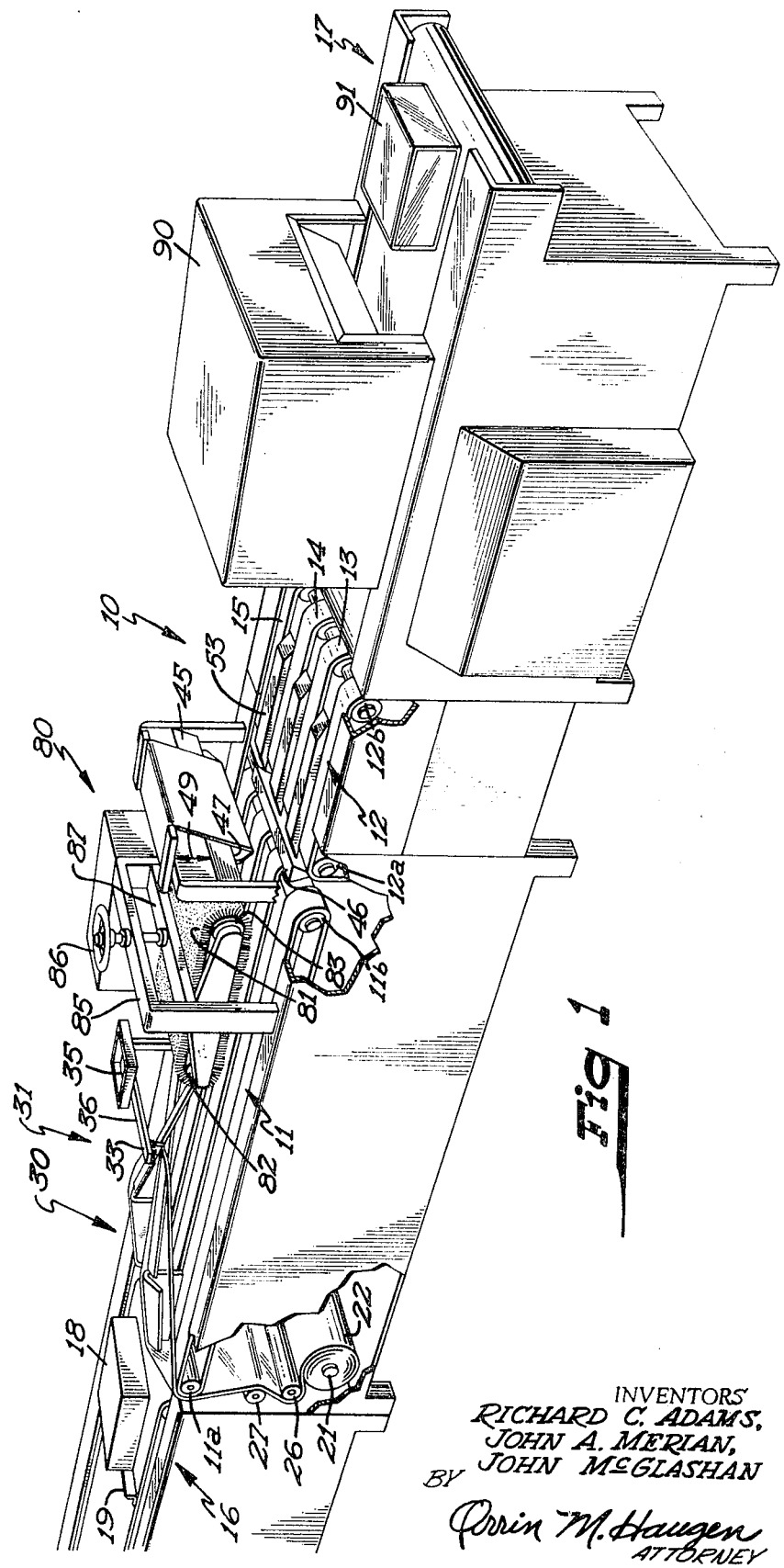

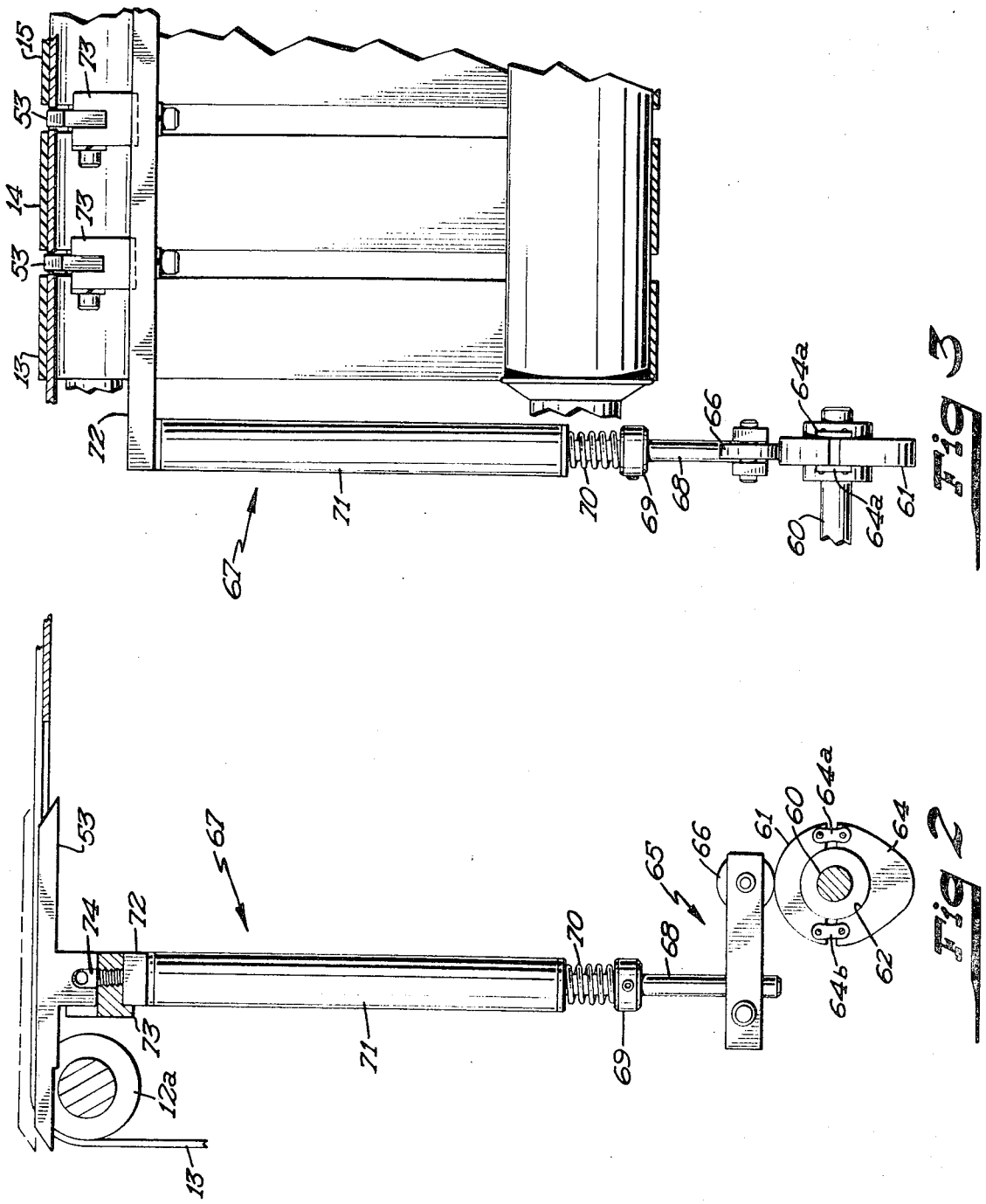

PATENTED APR 4 1972 3,653,177

INVENTORS
RICHARD C. ADAMS,
JOHN A. MERIAN,
JOHN McGLASHAN
BY
Orrin M. Haugen
ATTORNEY

RETARDER MECHANISM

The present invention relates generally to article wrapping apparatus, and more particularly to a shrink-wrap machine which is capable of effectively and efficiently forming transverse welds between adjacent articles which are being treated on a continuously moving conveyor. In the past, techniques have been employed for the continuous wrapping of film about a series of articles while moving along a conveyor line, such as, for example, packages or containers holding or retaining relatively heavy articles. Problems have developed in the effective wrap of these heavy articles, inasmuch as the transverse severing and welding operation creates excessive tension in the film as the welding and severing bar moves through the plane of the shrink-wrap film.

In the past, only light-weight articles could be effectively treated in this fashion since the action of the downwardly moving film converging welding bar would effectively halt, retard, or even reverse the direction of travel of the wrapped article which has moved downstream from the weld bar. In other words, as the weld bar moves through the plane of the wrapping films, the film tension would remain modest while the forward wrapped article was effectively stopped or actually moved in a reverse direction along the surface of the moving conveyor. This type of operation was not possible to achieve when heavy articles were employed, since their mass would establish excessive tensile forces along the surface of the film as the welding bar moved through the plane of the film to establish a transverse weld in the film wrapping material.

Briefly, in accordance with the present invention, an article wrapping means is provided for enclosing articles or packages as these articles or packages are carried along in predetermined spacing along a continuously moving conveyor. An intermittently operating weld bar is disposed along the continuously moving conveyor for forming transverse seals or welds between adjacently positioned wrapped articles. Immediately downstream from the weld bar, means are provided for intermittently elevating an article so as to remove it from the surface of the conveyor, thus permitting the weld bar to effectively seal the upper and lower surfaces of the film together at a point generally midway between adjacent wrapped articles, this being accomplished while the article approaching the weld bar continues to advance. By utilizing this technique, improved seals are formed inasmuch as tensile forces which would otherwise be created along the film do not develop, since the act of interrupting the motion of the forward package while permitting the trailing package to continue to advance toward the weld bar creates slack in the film span and thereby permits the transverse weld to be established without generation of tension.

The technique of the present invention is particularly adapted for use with equipment for applying a wrap of "shrink-wrap" film about an article, "shrink-wrap" being the term applied to those film products which respond with a substantial shrinkage when exposed to warm or hot environments. Films of this type are widely utilized in the art today, and are, of course, commercially available. Typical films of this type are rubber hydrochloride, particularly oriented rubber hydrochloride, which films are generally believed to be incorporated in "Pliofilm". Other examples of suitable films are shrinkable polyethylene or shrinkable polypropylene, both of which are commercially available.

Therefore, it is an object of the present invention to provide a means for wrapping articles with shrinkable film and form transverse seals in such film without the creation of excessive tensile forces in the film.

It is a further object of the present invention to provide an improved apparatus for wrapping articles with heat shrinkable film, the system including a weld bar for forming transverse welds or seals in the film prior to shrinking, this seal being formed without the creation of excessive tensile forces along the extent of the film.

It is yet a further object of the present invention to provide a means for momentarily interrupting the forward motion of a package as it moves along a conveyor belt, the interruption occurring at a point downstream from the transverse weld bar, the motion interrupting means including a plurality of individual lifting elements which are adapted to move upwardly through gaps formed between belts in a moving plural belt conveyor, and thereby intermittently move the wrapped article upwardly out of contact with the conveyor, and thereby hold the article which has already been sealed along its forward edge at dwell during the occurrence of the sealing, welding and severing operation along its trailing edge while the conveyor continues to advance the next trailing article.

Other and further objects of the present invention will become apparent to those skilled in the art upon a study of the following specification, appended claims, and accompanying drawings wherein:

FIG. 1 is an isometric view of a typical system which may be utilized to wrap heavy articles, and which incorporates the aspects of the present invention;

FIG. 2 is a side elevational view of the means utilized to momentarily disengage an article from the surface of the conveyor to thereby stop its forward progress, this figure being shown on a slightly enlarged scale;

FIG. 3 is an end elevational view of that portion of the apparatus shown in FIG. 2;

Figure 4:
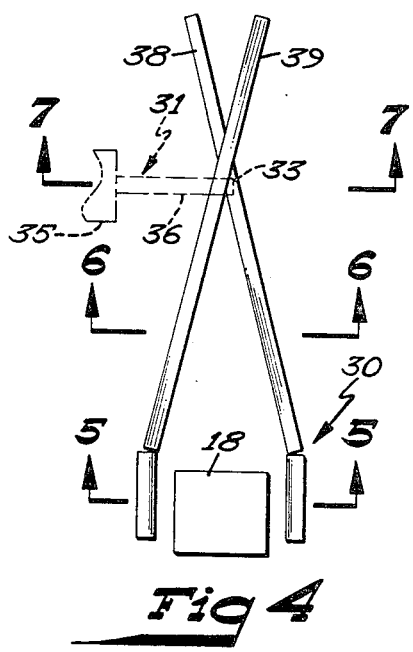
FIG. 4 is a top plan view of a typical folding bar arrangement for use in connection with the apparatus of the present invention.
Figure 5:
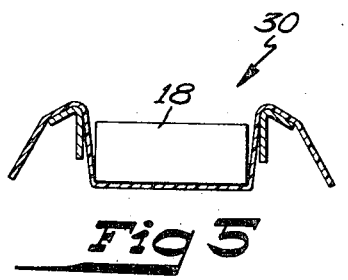
FIG. 5 is a detail elevational view, partly in section, taken along the line and in the direction of the arrows 5—5 of FIG. 4.
Figure 6:
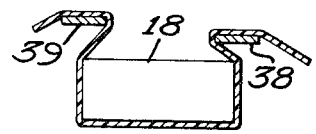
FIG. 6 is a view similar to FIG. 5, taken along the line and in the direction of the arrows 6—6 of FIG. 4.

In accordance with the preferred modification of the present invention, and with particular attention being directed to FIG. 1 of the drawings, the article wrapping apparatus generally designated 10 comprises an endless conveyor means with individual conveyor segments generally designated 11 and 12, these conveyor segments being typically carried and driven from the rolls 11A and 11B, and 12A and 12B as illustrated; and with at least conveyor segment 12 being in the form of a plurality of longitudinally or axially spaced belts or the like, such as the belts 13, 14 and 15. The conveyor system has an infeed or article receiving station shown generally at 16, and an article delivery end shown generally at 17. The system is adapted to run continuously, and therefore a typical article to be wrapped, such as the article or container 18 is urged forwardly by the infeed pusher 19 onto the conveyor 11, and preferably onto the conveyor 11 generally along the axis of the individual span of packaging film entering conveyor along or about roll 11A. Infeed pusher 19 is timed in that each individual article to be wrapped such as the article 18 will be sequentially delivered in a certain predetermined spaced relationship onto the conveyor segment 11.

Means are provided as at 21 for carrying and supporting a supply roll of packaging film such as the roll 22. As previously indicated, this film is preferably of the "shrink-wrap" type such as rubber hydrochloride or the like. While the apparatus illustrated in FIG. 1 indicates that a single roll of film is being utilized, it will be appreciated that two supply rolls could be utilized, the apparatus in such a situation being provided with means for bringing the article to be wrapped between the upper and lower films and ultimately around the entire surface of the article being wrapped. In the typical film feed apparatus, individual idler guide rolls such as the idler rolls 26 and 27 will be utilized to control the entry of the supply of film onto the endless conveyor means 11. As is indicated, the film is adapted to move along the direction of motion of the conveyor, and as it is moving, it is applied as a wrap about the individual articles. Suitable tensioning mechanisms, not shown, are preferably employed to control the delivery of film onto conveyor 11.

Figure 7:
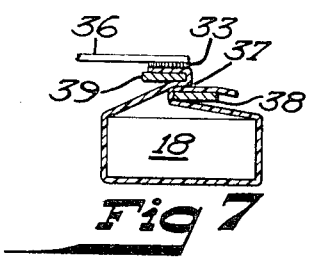
FIG. 7 is a view similar to FIGS. 5 and 6, taken along the line and in the direction of the arrows 7—7 of FIG. 4.

A wrap station generally designated 30 is provided along the extent of the conveyor, this station being shown in detail in FIGS. 4 through 7 inclusive, and including a solvent applicator head or member 31 supplied with a solvent or adhesive applying brush such as is illustrated at 33, solvent being used for films such as PVC, adhesive being used for films such as polyolefins. A solvent reservoir or tank 35 is disposed above the members 31 and 33, and supplies solvent, as required, by gravity through interconnecting conduit 36. Preferably, solvent is applied to the lower or underside of the top film layer, such as is illustrated in FIG. 7 of the drawings. Contact, under pressure, is thereby achieved as the films pass between the bite zone 37 established between the elongated film folding bars 38 and 39. As alternate techniques of forming enclosures, thermal bonding or adhesive bonding techniques may be employed in lieu of the solvent bonding. Each of these techniques is well known and widely practiced in the art.

After completion of the formation of the tubular enclosure, the articles are carried along the conveyor until the sealing station is reached. The sealing station employs a reciprocably moving weld bar 45 along with a back-up roll or pad 46, the bar 45 being electrically resistively heated or otherwise energized so as to provide a heated welding tip as at 47. Means are provided for reciprocably moving the weld bar 45, this motion being generally along the directions shown by the arrow 49, this motion being provided in a conventional fashion. Reference is hereby made to U. S. Pat. No. 2,947,345 for a disclosure of the details concerning the function of this sealing portion of the apparatus.

Figure 8:
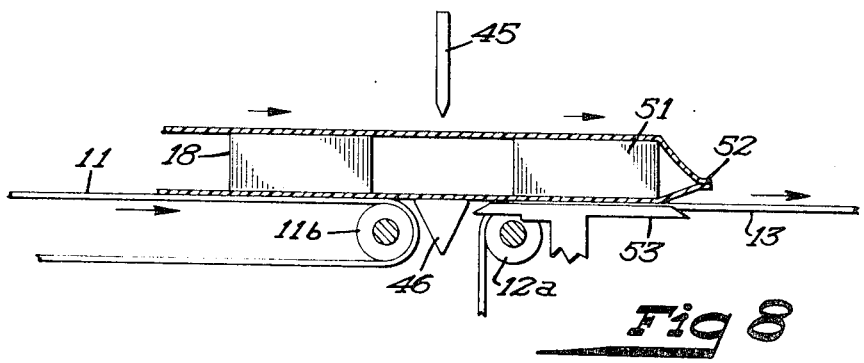
FIG. 8 is a side elevational view, partially in section, and illustrating the arrangement of the device during a typical operation cycle, just prior to the time that the welding bar prepares the seal in the film.
Figure 9:
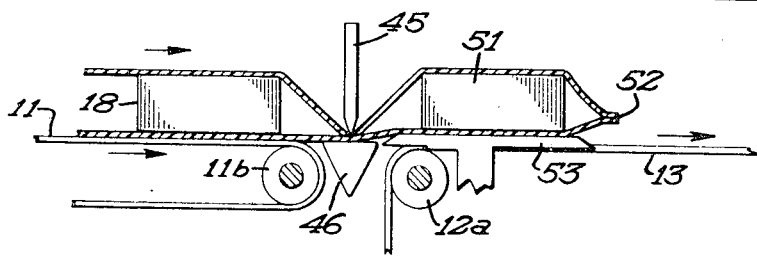
FIG. 9 is a view similar to FIG. 8, and illustrating the disposition of the elements at a point in time later from that of FIG. 8.

Attention is now directed to FIGS. 8 and 9 for a discussion of the operation of the weld bar 45 which forms a transverse seal in the tubular film enclosure such as the enclosure portion shown at 50 in FIG. 9. The partially wrapped article 51 shown in FIG. 8 has a film enclosure wrapped thereabout, the enclosure having a forward separation line as at 52, the rearwardly disposed transverse seal being in preparation in the sealing station and below the welding bar 45. As the article 51 reaches the disposition shown in FIG. 9, the lifting elements 53–53, which are normally disposed along a plane below the plane of conveyor 12, move upwardly to a point above the plane of the conveyor so as to elevate the article 51 above the plane of the conveyor and thereby hold the wrapped article at dwell while the weld bar 45 is moving in its downward direction of travel. While the article 51 is retained or maintained at dwell, the tubular film portion such as is shown at 50 will be permitted to develop slack so as to eliminate the generation of tension along the individual sections of film such as at 50. It will be apparent that the timing of the downward motion of the weld bar 45 coincides with the intermittent interruption of motion of the article 51, and this feature is, of course, possible by virtue of utilization of chain and sprockets or gear-drives and a single prime mover or motor.

Attention is now directed to FIGS. 2 and 3 of the drawings wherein the details of the lifting elements are illustrated. In this connection, rotating shaft 60 provides the energy required for actuation of the lifting elements. Cam disc 61 is secured to shaft 60 along its hub 62, lobe segment 64 being provided as a camming element to apply or urge a lifting force against the cam follower bar generally designated 65. Cam follower wheel 66 is utilized to make contact with cam disc 61 during its revolutions, in order to reduce friction and the like. The post generally designated 67 has a base segment 68 with an adjustment collar 69 secured thereto, collar 69 being utilized to control the disposition of resilient spring member 70 operating against the upper post segment 71 to deliver the lifting force necessary. Crossbar 72 is utilized for receiving individual lifting element assemblies thereon, the support bracket 73 being utilized to couple the plates 53 to the crossbar 72. Bolt couplings or the like may be utilized as at 74, for example. In the event it is desirable to adjust the lift, suitable coupling adjustments are provided on the cam follower 65 to accomplish this, such as by altering the disposition of cam follower 65 on segment 68. In the event it may be desirable to adjust the stroke of the lifting elements 53–53, it is possible to utilize a cam segment 64 with a modified lobe. Links 64A and 64B, which are master chain links, are simply removed and a different lifting lobe element 64 is set in place.

In order to provide for continuous propulsion or motion of the individual wrapped units as they move along the conveyor 11, an endless belt drive arrangement generally designated 80 is placed in superimposed relationship to the conveyor segment 11. This endless drive mechanism comprises an endless fur-coated belt 81 driven by cylinder elements 82 and 83, one of which is coupled to a suitable driving source, these elements 82 and 83 being contained within the confines of outer housing member 84. Inverted U-shaped element 85 couples or mounts the belt 81 onto the shaft, adjustment being provided by means of the screw element 86. Bar 87 carries or supports members 84 in suitable relationship to provide the desired elevation of the lower span or flight of belt 81 from conveyor 11. As will be appreciated, the drive rate for endless belt 81 is matched to the drive rate of conveyor 11, the purpose of the belt being to provide continuous motion for the items being supported or carried along belt 11. The length of belt 81 is controlled so as to provide coupling contact between mutually adjacent articles such as the articles 18 as they move along the path of conveyor 11.

While it is possible to introduce the individual articles onto the conveyor 11 in a continuous timed sequence, such as by the pusher 19, it is also possible to utilize other mechanisms for spacing the individual articles along the top span of conveyor 11. For example, it is possible to utilize random spacing or loading, if desired, however in such an event, it is necessary to establish a minimum spacing and utilize a photo-electric cell or the like to detect the presence of an article along the span of conveyor 11, and time the motion of the weld bar 45 and lifting elements 53—53 accordingly. In this connection, fur-drive belt 81 is desirable in that the device will not continue to feed or deliver film except when the unit is appropriately loaded. A suitable detecting means, as an alternative to the photo-electric cell, is a detecting cam or finger which is biased inwardly by means of a spring or the like, and which when cammed outwardly by an article traveling down the conveyor 11 provides an electrical signal by virtue of a pressure switch or the like. Such a signal may be utilized to establish appropriate time operation of the weld bar 45 and the lifting means 53.

After completion of the formation of the transverse seals, the individual articles will move along the upper surface of conveyor 12 and through the shrink tunnel 90, wherein they are subjected to an elevated temperature sufficient to dimensionally shrink the wrapping film which surrounds the article. The article emerges from the shrink tunnel with a configuration such as is shown at 91.

It will be appreciated that the details of the structure herein are provided for purposes of illustration, and that various mechanical equivalents may be utilized, if desired.

What is claimed is: with

1. Article wrapping apparatus for wrapping articles wit shrinkable film, and comprising in combination:
    a. endless conveyor means having an article receiving end and an article delivery end, said conveyor means comprising a plurality of parallelly disposed belts having gaps formed between adjacent belts and being adapted to run continuously;
    b. means for receiving a roll of shrinkable film and for delivering a supply of said film onto said endless conveyor means and along the direction of motion of the conveyor means;

c. means for sequentially delivering articles to be wrapped in first predetermined spaced relationship onto said article receiving end and in superimposed relationship to said shrinkable film;

d. a first station having means for applying a wrap of said film about said articles and enclosing said articles in a tube of said film having an axis parallel to said direction of motion;

e. a second station having means along said conveyor disposed downstream from said first station for forming a transverse welded closure about said articles and for severing said film at a point between adjacent wrapped articles and comprising an elongated weld bar disposed normally above the plane of said conveyor and adapted to intermittently move reciprocably into contact with the entire width of said film at a point generally midway between adjacent wrapped articles and performing said welding and severing operation; and f. article lifting and retarding means disposed immediately downstream from said weld bar having an article lifting element with a top surface normally disposed along a plane below the plane of said conveyor and adapted to intermittently move reciprocably upwardly from said normal disposition and through the gaps in said conveyor belts to elevate said wrapped articles from the plane of said conveyor and thereby hold said wrapped articles at dwell during said welding and severing operation.

2. The combination as defined in claim 1 being particularly characterized in that means are provided along said conveyor for urging said film into contact to form a longitudinal seal along superimposed layers of film to provide a tubular enclosure for said articles.

3. The combination as defined in claim 1 being particularly characterized in that shrink tunnel means are disposed along said conveyor downstream from said lifting and retarding means.

4. The combination as defined in claim 1 being particularly characterized in that said lifting element comprises a plurality of parallelly disposed lifting elements having a common transverse axis and generally parallelly disposed axes, said parallely disposed axes being arranged generally parallel to the axis of the conveyor means.

5. The combination as defined in claim 1 being particularly characterized in that said article lifting and retarding means are arranged to lift said articles from said conveyor means prior to the time contact is achieved between the upper surface of said film and said weld bar.

6. The combination as defined in claim 1 being particularly characterized in that said article lifting and retarding means comprises a plurality of lifting elements disposed across the transverse width of said conveyor.

7. The combination as defined in claim 1 being particularly characterized in that means are provided for detecting the presence of an article immediately upstream from said weld bar.

* * * * *